United States Patent [15] 3,637,432
Gibbs et al. [45] Jan. 25, 1972

[54] PREPARATION OF INHERENTLY COLLOIDALLY STABLE INTERPOLYMER LATEXES BY A CONTINUOUS ADDITION POLYMERIZATION TECHNIQUE AND ARTICLES COATED THEREWITH

[72] Inventors: Dale S. Gibbs; Ritchie A. Wessling; Earl H. Wagener, all of Midland, Mich.

[73] Assignee: The Dow Chemical Company, Midland, Mich.

[22] Filed: Oct. 2, 1969

[21] Appl. No.: 863,337

[52] U.S. Cl. ............117/161, 117/132 C, 117/138.8 E, 117/138.8 F, 117/138.8 N, 117/143 A, 117/148, 117/155 U, 117/145, 117/161 UC, 117/161 UH, 117/161 UN, 260/29.6 TA
[51] Int. Cl. .............................C09d 3/74, B32b 27/06
[58] Field of Search.............117/161 U, 161 UC, 161 UH, 117/161 UN; 260/29.6 TA

[56] References Cited

UNITED STATES PATENTS

| | | | |
|---|---|---|---|
| 2,300,920 | 11/1942 | Heuer | 260/29.6 |
| 2,748,027 | 5/1956 | Meier | 117/161 X |
| 2,805,963 | 9/1957 | Gaylord | 117/161 X |
| 2,910,385 | 10/1959 | Berry et al. | 117/161 X |
| 3,177,172 | 4/1965 | Adams | 260/29.6 |
| 3,219,611 | 11/1965 | Witwer | 117/161 X |
| 3,320,199 | 5/1967 | Brezinski et al. | 260/29.6 |
| 3,356,655 | 12/1967 | Sekmakas | 117/161 X |

Primary Examiner—William D. Martin
Assistant Examiner—Mathew R. P. Perrone, Jr.
Attorney—Griswold & Burdick, Ronald G. Brookens and Albin R. Lindstrom

[57] ABSTRACT

Preparation of inherently colloidally stable polymer latexes by the continuous, addition polymerization in aqueous dispersion of a copolymerizable monomeric mixture of specified amounts of (1) an essentially hydrophobic ethylenically unsaturated monomer, such as vinylidene chloride, (2) a second, relatively more hydrophilic ethylenically unsaturated monomer having a solubility of at least 1 weight percent in both the water and oil phase of the aqueous dispersion and (3) a significantly water soluble ionic material which is copolymerizable with (2) and which has an onium functionality; and improved substantially water-insoluble substrates having a coating of the dried residue of such aqueous dispersion thereon.

4 Claims, No Drawings

PREPARATION OF INHERENTLY COLLOIDALLY STABLE INTERPOLYMER LATEXES BY A CONTINUOUS ADDITION POLYMERIZATION TECHNIQUE AND ARTICLES COATED THEREWITH

In the well-known art of emulsion polymerization a monomeric, usually water-insoluble, liquid composition comprising a polymerizable, ethylenically unsaturated compound such as styrene, butadiene, methyl methacrylate, ethyl acrylate, vinyl acetate, vinyl chloride, vinylidene chloride or mixtures thereof, is colloidally emulsified in an aqueous medium that usually contains a wetting agent or surfactant, such as a water-soluble alkali soap, and a polymerization catalyst such as potassium persulfate. The resulting colloidal emulsion is then subjected to conditions conducive to polymerization of the monomeric constituents to produce an aqueous colloidal dispersion of the corresponding polymeric product, the aqueous colloidal dispersion being commonly called a latex.

The stability of the resulting polymer latex (aqueous colloidal dispersion) against coagulation or precipitation of its polymer ingredient depends primarily upon the kind and amount of surfactants and the like that are contained in the aqueous suspending medium. In many instances, the dispersions are quite unstable, particularly when subjected to mechanical agitation, to heat or cold, or upon addition to the dispersion of polyvalent ions such as ionized calcium salts, such influences causing coagulation of the polymer particles. In some instances, the stability of the latex can be improved by adding further amounts of surfactants or other stabilizers to the colloidal dispersions after completion of the polymerization step. However, latexes stabilized with external surfactants are stable only to a limited degree and are more or less vulnerable to external destabilization.

Moreover, in many instances and for many purposes the conventionally employed water-soluble surfactants and stabilizers (added to increase the latex stability) are ultimately objectionable. For example, in coatings derived from aqueous latexes by evaporation of water from a layer of such latex, the nonvolatile surfactants remain together with the polymer deposit. In many instances the water-soluble ingredients of the coating seriously and deleteriously affect the quality of the coating, as for example, the adhesion of the coating to the substrate as well as the barrier and heat seal properties of the coating.

It is an object of this invention to provide improved polymer latexes which are colloidally stable without the utilization of the conventional water-soluble wetting agents or surfactants and which form continuous adherent dried coatings of desired barrier, heat seal and binding capacity properties.

A further object is to provide coated products comprising a substrate material having a continuous, adherent, dried coating of the prescribed polymer latex thereon.

Other objects and advantages of the invention will be evident in the following description.

The objects of this invention have been attained by the use of a polymer latex consisting essentially of water and an interpolymer prepared by the essentially continuous addition polymerization in aqueous dispersion of 1. between 50 and 95 percent based on the total weight of monomers used of essentially hydrophobic ethylenically unsaturated monomeric material;
2. from about 2.0 to 30 weight percent based on the weight of (1) and (2) of a second relatively more hydrophilic ethylenically unsaturated monomeric material wherein such monomeric material has a solubility in both the water phase and oil phase of the polymer latex of at least 1 weight percent at the temperature of polymerization; and from 0.5 to about 5 weight percent based on the total weight of other monomers of an ionic significantly water-soluble material which is copolymerizable with (2) and is selected from the group of onium salts having the formula:

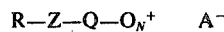

wherein the radical R is selected from the group consisting of vinyl and α-substituted vinyl; the symbol Z represents a difunctional linking group which will activate the double bond in the vinyl group; —Q— a divalent hydrocarbon which can be substituted with other functional groups having its valence bonds on different carbon atoms: $O_N^+$ is an onium functionality and the symbol $A^-$ represents an anion.

The essentially hydrophobic monomers of (1) above include any ethylenically unsaturated monomeric material, which copolymerizes readily in aqueous dispersion with the monomeric materials of (2). A particularly preferred monomeric material for use in preparing the inherently colloidally stable polymer latexes contemplated by this invention is vinylidene chloride or monomeric mixtures containing predominant amounts of vinylidene chloride. Utilization of these monomers in the prescribed amount provides for the obtainment of a continuous and continuously adherent dried coating for a wide variety of substrates, which coatings are characterized by excellent barrier, heat seal and binding capacity properties. Exemplary of other monomers which may be advantageously used, depending on the properties desired in the polymer latex and coating obtained therefrom, include styrene; the alkyl styrenes, particularly the tertiary butyl styrenes; alkyl acrylates and methacrylates, where the alkyl group contains at least about eight carbon atoms; and vinyl esters or fatty acids containing at least about eight carbon atoms.

The relatively hydrophilic monomers of (2) above include those materials which are readily copolymerizable with (1) in aqueous dispersion, i.e., which copolymerize within a period of less than about 40 hours at a temperature ranging from the freezing point of the monomeric serum up to about 100° C., and which have a solubility in both the water and the oil phase of the polymer latex of at least 1 weight percent at the temperature of polymerization. Exemplary of a preferred material, particularly when used in conjunction with monomeric vinylidene chloride, is acrylonitrile. Other monomers which may be advantageously employed include methacrylic acid and methyl methacrylate, hydroxy ethyl and propyl acrylates, hydroxyethylmethacrylate, acrylic acid, methacrylonitrile, acrylamide and the lower alkyl and dialkylacrylamides, acrolein, methylvinyl ketone and vinyl acetate. These monomers are employed in amounts of from 2.0 to 30 weight percent, based on the total weight of the nonionic monomers used, to provide for the necessary reactivity with the copolymerizable ionic material of (3) and also to provide for the required solubility of the interpolymer in water. Thus, such materials may be referred to as "go-between" monomers. It is to be understood that the optimum amount of such relatively hydrophilic monomers may vary somewhat within the prescribed range depending upon the amount of hydrophobic monomer used in preparing the polymer latex as well as upon the amount and type of the copolymerizable ionic monomer used.

The copolymerizable ionic monomer of the polymer latexes of the present invention are those monomeric materials which contain in their structure both an ionizable group and a reactive double bond, are significantly soluble in water, are copolymerizable with the hydrophilic monomer constituent (2) and where the substituent on the double bond is chemically stable under the conditions normally encountered in emulsion polymerization. Particularly useful are the quaternary ammonium and sulfonium salts which may be described by the formula:

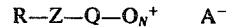

wherein the radical R is selected from the group consisting of vinyl and α-substituted vinyl; where the symbol Z represents a difunctional linking group which will activate the double bond present in the vinyl group, e.g., groups of the structure:

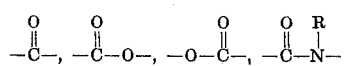

and the like; where —Q— is a divalent hydrocarbon having its valence bonds on different carbon atoms, e.g., the alkylene and arylene divalent hydrocarbon radicals having from one to about eight carbon atoms; $O_N^+$ is an onium functionality and $A^-$ is an anion.

Exemplary of the onium ions is:

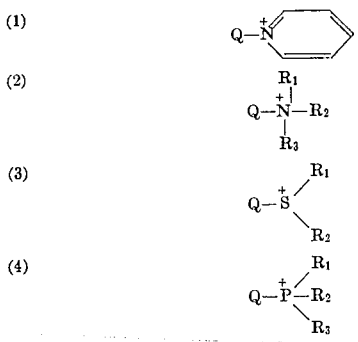

wherein in (2) R can be H, alkyl, aryl, and hydroxyl alkyl, and wherein in (3) and (4) R is alkyl, aryl, or hydroxyalkyl.

The solubility of the defined copolymerizable ionic materials as described herein is strongly influenced by the anion, $A^-$. Exemplary of preferred anions are the monovalent hydroxide, bicarbonate, halide, acetate and nitrates although divalent anions may also be used if desired.

It is further to be noted that with one of the ions above, and the usual choices for R and Z, the solubility of the monomer depends on Q. As indicated, this group can be either aliphatic or aromatic and its size will determine the hydrophilic/hydrophobic balance in the molecule, i.e., if Q is relatively small the monomer is water soluble but as Q becomes progressively larger the surface activity of such monomer increases until it becomes a soap and ultimately a water insoluble wax. It is to be understood, however, that the limiting size of Q depends on R, Z, $O_N^+$ and $A^-$. As exemplary of the above it has been found that alkylated amino alkyl methacrylates of the formula:

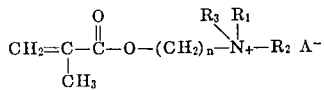

wherein $n$ is 2 or 3 and wherein $A^-$ is an anion which makes the salt water-soluble, are highly acceptable copolymerizable ionic materials for use in the present invention.

Further, the selection of R and Z is governed by the reactivity needed and the selection of Q is usually determined by the reaction used to attach the onium ion to the base monomer (or vice versa).

It has been found that 3-trimethylamino, 2-hydroxy propyl methacrylate is particularly effective for use with monomeric vinylidene chloride and the relatively hydrophilic monomer acrylonitrile when used in the amounts and in the manner called for by the present invention.

As previously indicated, the polymer latexes used in the present invention must be prepared from the prescribed combination of monomeric materials and, in addition, are preferably prepared in aqueous dispersion by an essentially continuous, carefully controlled addition of the requisite polymerization constituents (including polymerization initiator systems if desired) to the aqueous medium.

In the process of the present invention it is often preferred to first add a small amount of the monomeric materials, as defined herein, to the aqueous medium having the desired pH value, followed by the subsequent addition of the necessary polymerization initiator, to form a polymeric seed latex in order to aid in the control of particle size. When forming such polymeric seed latexes by the procedure as described herein, very small amounts of conventional wetting agents such as quaternary ammonium soaps or the like, may be incorporated in the aqueous medium to further aid in the attainment of particles of desired size. The addition of such wetting agents, however, is not critical for the production of the highly stable aqueous colloidal dispersions of polymeric particles.

Following the formation of the polymeric seed latex, the remaining polymerization constituents are simultaneously and continuously added under carefully controlled conditions to the aqueous medium.

The compositions, as described herein, are subjected to conditions conducive to polymerization of the polymerizable constituents. In most instances, the temperature of the aqueous dispersion is adjusted, e.g., to a temperature between about the freezing point of the serum and 100° C. to activate the polymerization. Other means, such as exposure of the composition to active radiation can be employed to promote polymerization of the polymerizable constituent.

The highly stable polymer latexes of the present invention are characterized by the virtual absence of undesirable coagulum which often results when polymeric latexes are stabilized by conventional water-soluble wetting agents or surfactants. Thus, such latexes combine the highly beneficial properties of optimum colloidal stability, reduced viscosities at relatively high-polymer solids content, low-foaming tendencies and excellent product uniformity and reproducibility.

Furthermore, such latexes are particularly useful for preparing coated products comprising a wide variety of substrates having a continuous, adherent, dried coating of such latex thereon which coating has excellent barrier, flexibility, heat seal and binding capacity properties.

Exemplary of the substrates which may be advantageously coated with the polymer latexes of this invention are sheets or films of: the nonaromatic hydrocarbon olefin polymers such as the polymers and interpolymers of ethylene, propylene, and butylene and the like and their halogenated derivatives; the aromatic hydrocarbon polymers such as the polymers and interpolymers of styrene and the like; the polyesters such as polyethylene terephthalate and the like; various polyamides such as polyhexamethylene adipamide among others; polyimides; the halogenated ethylene polymers such as the vinyl and vinylidene chloride homopolymers and interpolymers; polyacrylonitrile; regenerated cellulose; and the various cellulose esters such as cellulose acetate, cellulose nitrate and cellulose acetate butyrate; polyvinyl acetals; vinyl combinations such as polyvinyl chloride/polyvinyl acetate copolymers; fibrous cellulosic materials such as tissue paper, book papers, crepe paper, wrapping paper, cardboard, chipboard, wallboard and the like; metals such as aluminum and tin, among others; wood products such as plywood; textiles such as cotton textiles and fabrics; other vegetable fiber products; and other substrata which are relatively insoluble in the coating dispersions of the present invention. It is to be understood that the polymer latexes described herein can also be used to cast unsupported films or sheets if desired.

The following example illustrates the polymer latexes and preparation of coated products therefrom according to this invention, but is not to be construed as limiting its scope. In the example, parts and percentages are by weight unless otherwise indicated.

EXAMPLE

A. Seed Reaction

Into a 4 liter flask was introduced 500 g. of distilled water and 1 gram of dodecyl benzyl trimethyl ammonium chloride. The mixture was adjusted to a pH of 3.5 with acetic acid and purged with 99.9 percent $N_2$ for 40 minutes. From a monomer mixture consisting of 1,800 g. vinylidene chloride, 100 g. butyl acrylate, 100 g. acrylonitrile, and 6.09 of an 83.4 percent testing butyl hydroperoxide, 50 g. were added and the polymerization was initiated by feeding a 0.25 percent solution of hydroxylamine hydrochloride into the reaction mixture at a rate of 7.67 g. per hour. The seed reaction was allowed to go for 1 hour and 30 minutes at 25° C. after which the streams described below were fed into the mixture.

B. Continuous Addition Polymerization

Polymerization was maintained by the addition of three separate streams of reactants:

1. The monomer mixture described above was added, using a water displacement technique, at a rate of 55 g./hour for 20 hours.
2. An emulsifier stream containing 2 percent by weight of the cationic comonomeric emulsifier 3-trimethylamino-2-hydroxy propyl methacrylate (based on the total weight of monomers pumped) adjusted to pH 4.0 was added at a rate of 20 g./hour for 20 hours.
3. A reducing agent stream containing 0.25 percent by weight hydroxylamine hydrochloride (based on total weight of monomer pumped) was added at a rate of 7.67 g./hour for 20 hours.

The polymerization was allowed to continue for 20 hours after which the monomer and emulsifier streams were stopped and the reducing agent stream was allowed to continue for 1 additional hour. The latex was filtered and a shear stability test was run at 45° giving a value of 1.0 percent coagulum after 20 minutes at 2,700 r.p.m. The filtered product, when applied as a dried thin layer on a supporting substrate, formed a continuous, clear, uniformly adherent and nonblocking film.

A second polymer latex was then prepared as described herein using identical materials but wherein the acrylonitrile constituent was excluded. This latex was unexpectedly characterized by having a shear stability value of over 5.0 percent coagulum (wherein such value was determined as described above) and evidenced more pronounced tendencies for undesirable blocking.

This data illustrates that a "go-between" hydrophilic monomer, e.g., acrylonitrile must be used to prevent the formation of undesirable coagulum.

By way of additional comparison, a polymer latex prepared as described herein using identical materials but where the cationic comonomeric emulsifier was excluded, also was characterized by undesirable formation of coagulum and blocking.

What is claimed is:

1. A coated product comprising an essentially water-insoluble sheet or film material having a dried, continuous, self-adherent polymeric coating on at least one major surface thereof, said coating being at least about 0.1 mil in thickness and consisting of a solid addition polymer resulting from the dried residue of a latex prepared by the substantially continuous addition polymerization in aqueous dispersion of a mixture of:

1. between 50 and about 95 weight percent based on the total weight of monomers used of an essentially hydrophobic ethylenically unsaturated monomeric material;
   2. from about 2.0 to 30 weight percent based on the weight of (1) and (2) of a second relatively more hydrophilic ethylenically unsaturated comonomer which has a solubility in both the water and the oil phase of said aqueous dispersion of at least 1 weight percent at the temperature of polymerization; and
   3. from 0.5 to about 5 weight percent based on the total weight of monomer used of a significantly water-soluble ionic material which is copolymerizable with (2) which material is selected from the group of onium salts having the formula:

$$R\text{---}Z\text{---}Q\text{---}O_N^+ \quad A^-$$

wherein the radical R is selected from the group consisting of vinyl and α-substituted vinyl; the symbol Z represents a difunctional linking group which will activate the double bond present in said vinyl group; —Q— is a divalent hydrocarbon having its valence bonds on different carbon atoms; $O_N^+$ is an onium ion and the symbol $A^-$ represents an anion.

2. The coated product of claim 1 wherein (1) of the polymer latex is predominantly vinylidene chloride.
3. The coated product of claim 1 wherein (1) of the polymer latex is predominantly vinylidene chloride and (2) is acrylonitrile.
4. The coated product of claim 1 wherein (1) of the polymer latex is predominantly vinylidene chloride, (2) is acrylonitrile and (3) is 3-trimethylamino, 2-hydroxy propyl methacrylate.

* * * * *